United States Patent
Suzuki et al.

(10) Patent No.: US 8,137,011 B2
(45) Date of Patent: Mar. 20, 2012

(54) ACTUATOR AND BLADE DRIVE DEVICE FOR CAMERA

(75) Inventors: Mitsuru Suzuki, Chiba (JP); Akihiro Ito, Chiba (JP); Shigeru Yanagisawa, Chiba (JP); Akira Yasuda, Chiba (JP)

(73) Assignee: Seiko Precision Inc., Narashino-shi (JP)

( * ) Notice: Subject to any disclaimer, the term of this patent is extended or adjusted under 35 U.S.C. 154(b) by 0 days.

(21) Appl. No.: 12/470,914

(22) Filed: May 22, 2009

(65) Prior Publication Data

US 2009/0232487 A1  Sep. 17, 2009

Related U.S. Application Data

(63) Continuation of application No. PCT/JP2007/074324, filed on Dec. 18, 2007.

(30) Foreign Application Priority Data

Dec. 27, 2006  (JP) .................................. 2006-351573

(51) Int. Cl.
*G03B 9/10* (2006.01)
*G03B 9/08* (2006.01)

(52) U.S. Cl. ........................................ 396/463; 396/493
(58) Field of Classification Search .................... 396/463
See application file for complete search history.

(56) References Cited

U.S. PATENT DOCUMENTS

| 5,689,746 A * | 11/1997 | Akada et al. .................. 396/508 |
| 5,915,141 A * | 6/1999 | Ebe ................................ 396/470 |
| 6,565,270 B2 * | 5/2003 | Naganuma ..................... 396/454 |
| 6,733,192 B2 * | 5/2004 | Watanabe ...................... 396/463 |
| 6,796,729 B2 * | 9/2004 | Mizukami et al. ............. 396/497 |
| 6,867,932 B2 * | 3/2005 | Noguchi ........................ 359/739 |
| 6,933,980 B1 * | 8/2005 | Matsumoto ................... 348/363 |
| 7,172,349 B2 * | 2/2007 | Miyakawa ..................... 396/488 |
| 7,771,132 B2 * | 8/2010 | Toyoguchi et al. ........... 396/464 |
| 2004/0047626 A1 | 3/2004 | Miyazaki |
| 2004/0062542 A1 * | 4/2004 | Watanabe ...................... 396/463 |
| 2004/0126106 A1 * | 7/2004 | Horiike ......................... 396/463 |
| 2005/0275295 A1 | 12/2005 | Horiike |
| 2005/0286889 A1 * | 12/2005 | Kihara .......................... 396/463 |

(Continued)

FOREIGN PATENT DOCUMENTS

CN   1734344 A   2/2006

(Continued)

OTHER PUBLICATIONS

International Search Report for International Application No. PCT/JP2007/074324 dated Mar. 5, 2008.
Chinese Office Action mailed Jun. 3, 2010 in corresponding application with English translation (10 pages).
Japanese Office Action mailed Mar. 22, 2011 in a corresponding application with English translation (5 pages).

(Continued)

*Primary Examiner* — Clayton E LaBalle
*Assistant Examiner* — Bret Adams
(74) *Attorney, Agent, or Firm* — Kratz, Quintos & Hanson, LLP

(57) ABSTRACT

An electromagnetic actuator includes: a coil for excitation; a stator excited with different magnetic poles by energization of the coil; a rotor magnetized with the different magnetic poles in accordance with a circumferential direction, and rotated by a magnetic force generating between the rotor and the stator; and an outputting member rotated in conjunction with the rotor and outputting rotational movement of the rotor to a first blade and a second blade. The outputting member is provided with a fitting hole press-fitted onto the rotor.

1 Claim, 4 Drawing Sheets

U.S. PATENT DOCUMENTS

| | | |
|---|---|---|
| 2006/0006968 A1 | 1/2006 | Mizumaki |
| 2008/0025720 A1* | 1/2008 | Huang et al. .................. 396/463 |
| 2009/0180773 A1* | 7/2009 | Yasuda et al. ................. 396/463 |
| 2009/0232487 A1* | 9/2009 | Suzuki et al. ................. 396/463 |

FOREIGN PATENT DOCUMENTS

| | | |
|---|---|---|
| JP | 2001-352741 | 12/2001 |
| JP | 2004-101860 A1 | 4/2004 |
| JP | 2004-309531 A1 | 11/2004 |
| JP | 2005-354875 A1 | 12/2005 |
| JP | 2006-011293 | 1/2006 |
| JP | 2006-25491 A1 | 1/2006 |
| JP | 2006-246556 | 9/2006 |
| JP | 2006-246556 A1 | 9/2006 |
| JP | 2006-333610 A1 | 12/2006 |

OTHER PUBLICATIONS

Korean Office Action mailed Dec. 20, 2010 in corresponding application with English translation (6 pages).

Notification of Reasons for Refusal issue in counterpart application No. 2006-351573 mailed Jul. 19, 2011 with English translation (5 pages).

Korean Intellectual Property Office Decision of Refusal issued in counterpart application dated Aug. 31, 2011 with English translation (6 pages).

Notification of Submission of Opinion received in counterpart application No. 10-2009-7008007 from the Korean Intellectual Property Office mailed Nov. 4, 2011 with English translation (6 pages).

* cited by examiner

ACTUATOR AND BLADE DRIVE DEVICE FOR CAMERA

CROSS-REFERENCE TO RELATED APPLICATION

This application is a continuation of and claims priority to International Patent Application No. PCT/JP2007/074324 filed on Dec. 18, 2007, which claims priority to Japanese Patent Application No. 2006-351573 filed on Dec. 27, 2006, subject matter of these patent documents is incorporated by reference herein in its entirety.

BACKGROUND OF THE INVENTION

1. Field of the Invention

The present invention relates to an actuator and a blade drive device for a camera.

2. Description of the Related Art

Conventionally, there has been known an actuator used for driving a shutter blade employed in a camera, and composed of a rotor, a stator, a coil for exciting the stator, and an outputting member for transmitting the rotational movement of the rotor to the shutter blade. Japanese Unexamined Patent Application Publication No. 2004-309531 discloses a device in which a rotor and a drive pin, serving as an outputting member, are integrally formed.

However, in the case where the rotor and the drive pin are integrally formed, it is difficult to change the positional relationships between the rotor and the drive pin whereas it is effective for downsizing. Therefore, it is difficult to change an angular position of the drive pin relative to the rotor according to a design variation.

SUMMARY OF THE INVENTION

It is therefore an object of the present invention to provide an actuator and a blade drive outputting member rotated in conjunction with the rotor and outputting rotational movement of the rotor to a member, and the outputting member being provided with a fitting hole press-fitted onto the rotor.

With such a configuration, the outputting member is fitted onto the rotor with the angular position of the outputting member relative to the rotor being adjusted. This changes the design of the angular position with easy.

Additionally, as compared with a conventional actuator in which an outputting member is fitted onto a rotor shaft having a diameter smaller than that of a rotor, an abutting area of the outputting member with the rotor is larger. Therefore, as compared with an actuator in which the outputting member is press-fitted onto the rotor shaft, a misalignment of the angular position of the outputting member relative to the rotor can be restricted while the rotor drives. Consequently, the above actuator can be employed as a driving source of a device in which a load is greatly applied on an outputting member.

According to another aspect of the present invention, there is provided a blade drive device for a camera including: a base plate having an opening; a blade for opening and closing the opening; and an actuator for driving the blade. The actuator includes; a coil for excitation; a stator excited with different magnetic poles by energization of the coil; a rotor magnetized with the different magnetic poles in a circumferential direction thereof, and rotated by a magnetic force generating between the rotor and the stator; and an outputting member rotated in conjunction with the rotor and outputting rotational movement of the rotor to the blade, and the outputting member being provided with a fitting holes press-fitted onto the rotor.

With such a configuration, the outputting member is fitted onto the rotor with the angular position of the outputting member relative to the rotor being adjusted. This changes the design of the angular position with easy. Therefore, in the design stage of the blade drive device for a camera, it is possible to change and adjust the angular position of the outputting member relative to the rotor, after locations of other parts are prior designed.

Additionally, as compared with a conventional actuator in which an outputting member is fitted onto a rotor shaft having a diameter smaller than that of a rotor, an abutting area of the outputting member with the rotor is larger. Therefore, as compared with an actuator in which the outputting member is press-fitted onto the rotor shaft, a misalignment of the angular position of the outputting member relative to the rotor can be restricted while the rotor drives. This allows the blade drive device for a camera to be compatible with a case of a greater load applied on the outputting member, such as a high shutter speed.

BRIEF DESCRIPTION OF THE DRAWINGS

Preferred embodiments of the present invention will be described in detail with reference to the following drawings, wherein.

DESCRIPTION OF THE PREFERRED EMBODIMENTS

A description will now be given, with reference to the accompanying drawings, an embodiment of the present invention.

Figure 1:
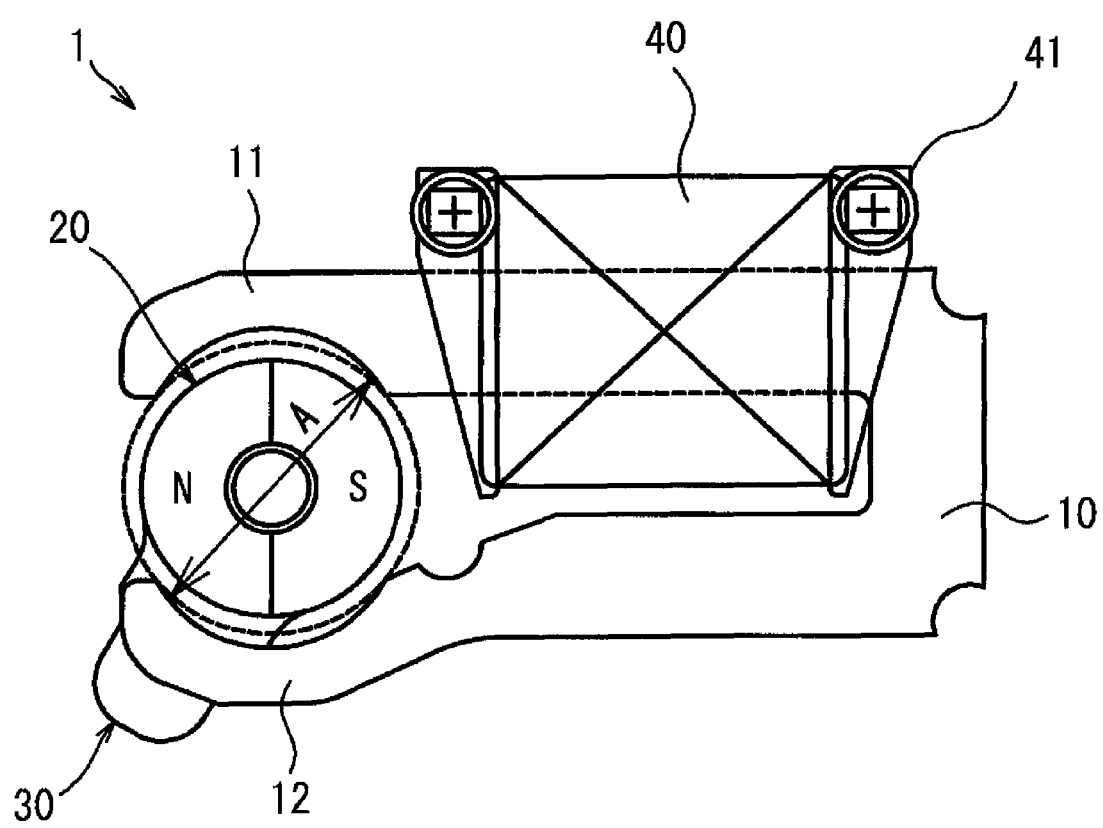
FIG. 1 is a schematic view of an electromagnetic actuator according to an embodiment of the present invention.

FIG. 1 is a schematic view of an electromagnetic actuator according to an embodiment of the present invention.

An electromagnetic actuator 1 includes a stator 10, a rotor 20, an outputting member 30, and a coil 40.

The stator 10 has a U shape, and has a first magnetic pole portion 11 and a second magnetic pole portion 12 at respective ends thereof. The rotor 20 has a cylindrical shape, and two different poles magnetized in the circumferential direction. The coil 40 is wound around a coil bobbin 41. The coil 40 is energized to excite the first magnetic pole portion 11 and the second magnetic pole portion 12 so as to have opposite polarities.

The outputting member 30 outputting rotational movement of the rotor 20 is attached to one side of the rotor 20. Therefore, the outputting member 30 swings in conjunction with the rotor 20 within a predetermined rotational range.

Figure 2:
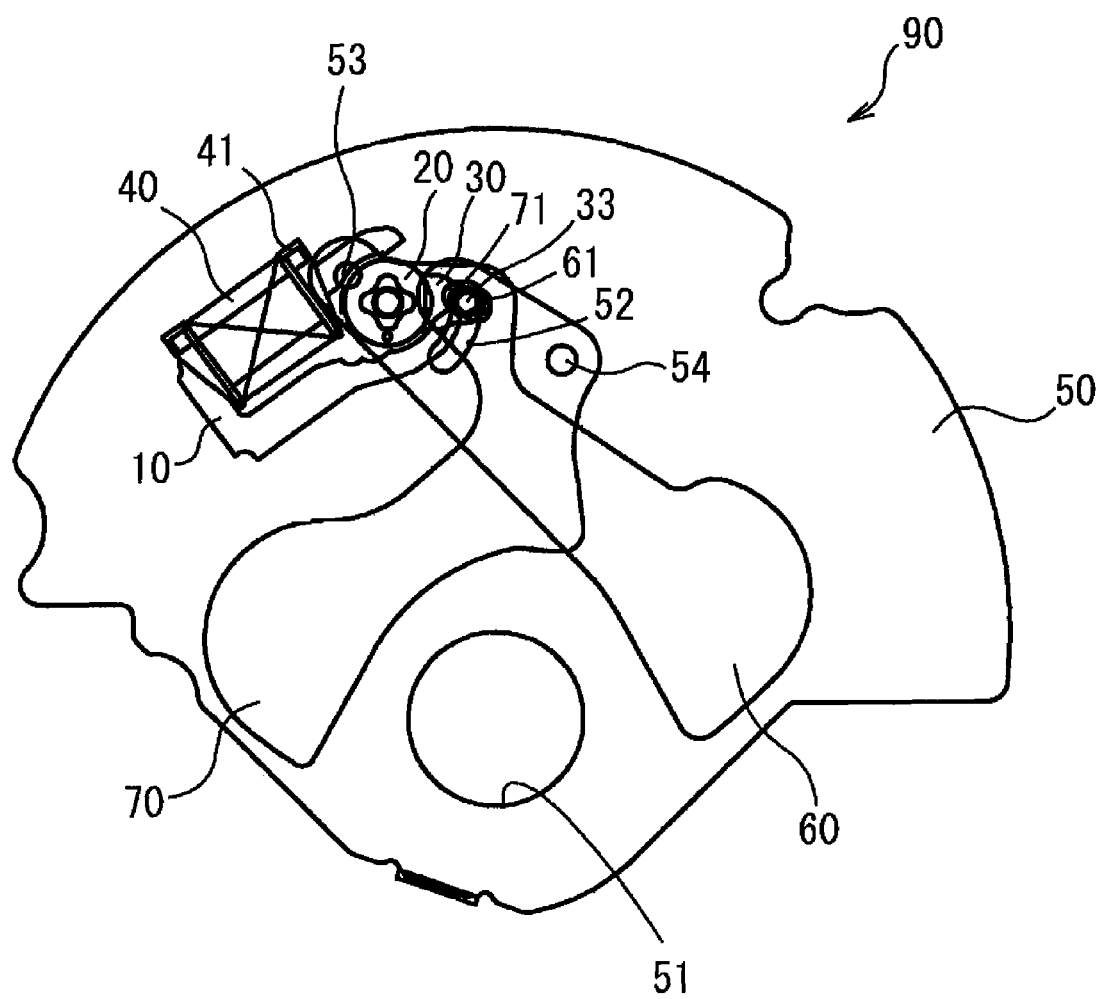
FIG. 2 shows the blade drive device for a camera in a fully opened state.
Figure 3:
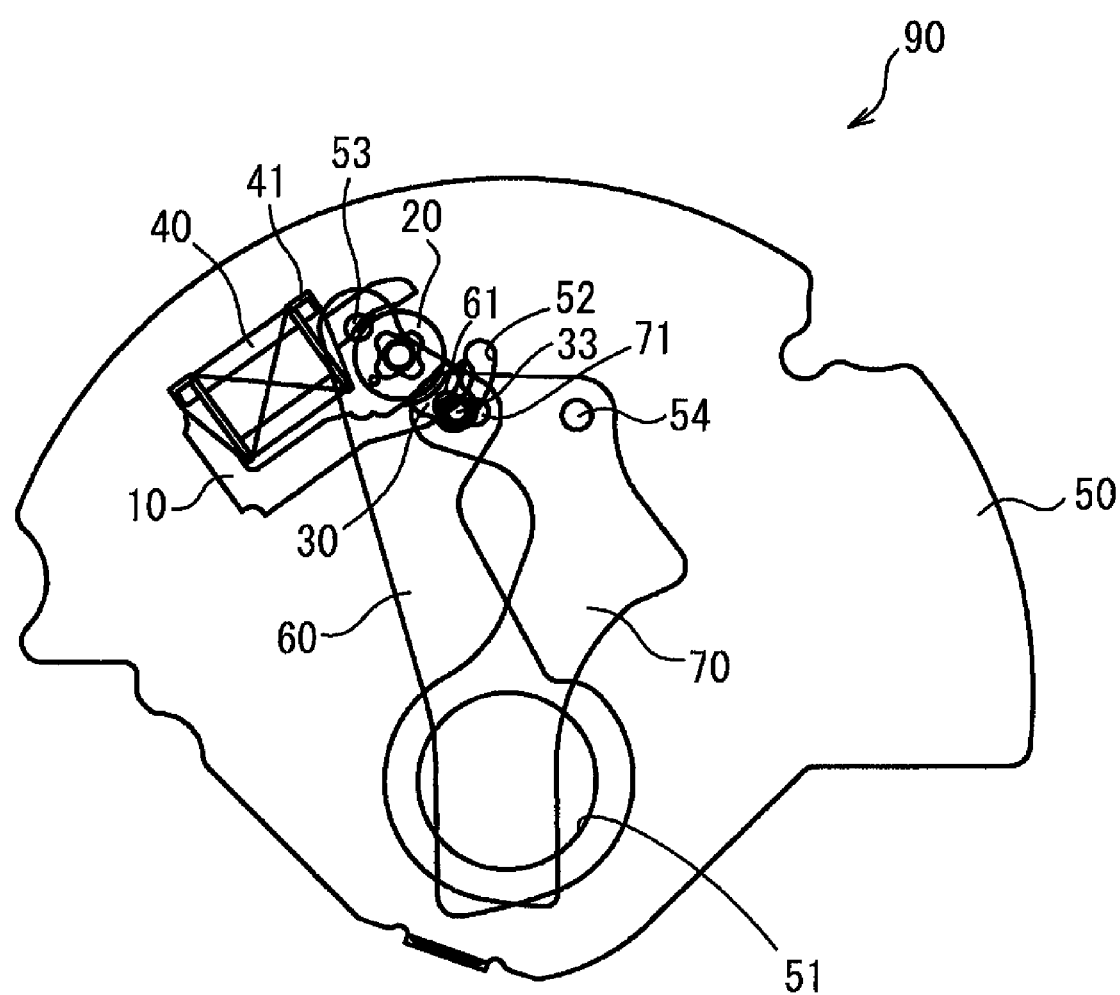
FIG. 3 shows the blade drive device for a camera in a fully closed state.

FIGS. 2 and 3 are perspective views of a blade drive device for a camera 90 employing this electromagnetic actuator as a driving source. More specifically, FIG. 2 shows the blade drive device for a camera 90 in a fully opened state, and FIG. 3 shows the blade drive device for a camera 90 in a fully closed state.

The blade drive device for a camera 90 employing the electromagnetic actuator 1 includes a base plate 50, a first blade 60, and a second blade 70. The base plate 50 has an aperture 51 for shooting. The first blade 60 and the second blade 70 are disposed at a front side in FIGS. 2 and 3. The actuation of the first blade 60 and the second blade 70 changes the aperture 51 into the fully closed state or the fully opened state. The electromagnetic actuator 1 is disposed at the back side of the front side at which the first blade 60 and the second blade 70 are disposed. For this reason, the electromagnetic actuator 1 as shown in FIGS. 2 and 3 and that as shown in FIG. 1 are symmetrical.

The base plate 50 has a receiving slot 52 for receiving the rotation of the outputting member 30. The receiving slot 52 has an arc shape. The outputting member 30 penetrates the receiving slot 52 to be capable of rotating within a predetermined range. That is to say, the receiving slot 52 has a function of restricting and controlling the rotational range of the rotor 20.

The first blade 60 and the second blade 70 have slots 61 and 71, respectively, engaged with the outputting member 30. The first blade 60 and the second blade 70 swing about a spindle 53 and a spindle 54, respectively, formed in the base plate 50. Therefore, the rotational movement of the rotor 20 transmits to the first blade 60 and the second blade 70 via the outputting member 30, and the first blade 60 and the second blade 70 perform the shutter operation.

Figure 4:
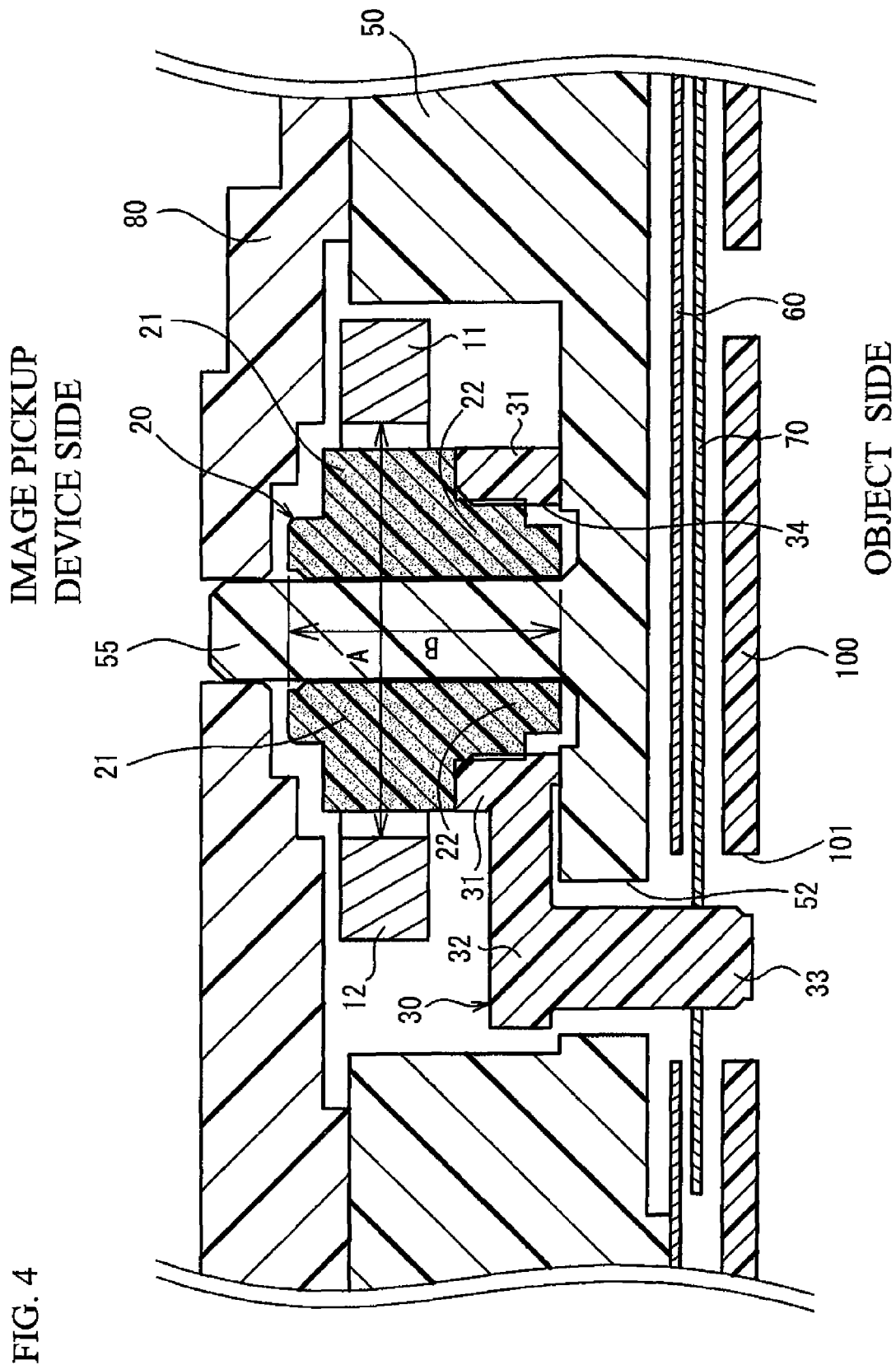
FIG. 4 is a cross-sectional view showing the configuration of the blade drive device for a camera.

FIG. 4 is a cross-sectional view showing the configuration of the blade drive device for a camera 90.

A supporting plate 80 is disposed at an image pickup device side of the base plate 50, and supports the electromagnetic actuator 1 between the supporting plate 80 and the base plate 50. A blade supporting plate 100 is disposed at an object side of the base plate 50, and supports the first shutter blade 60 and the second shutter blade 70 between the blade supporting plate 100 and the base plate 50.

A spindle 55 is formed in the base plate 50 and extends toward the image pickup device side along the optical axis. The rotor 20 is rotatably supported on the spindle 55.

The rotor 20 has a large diameter portion 21 and a small diameter portion 22 which differ in their diameter. The large diameter portion 21 is located closer to the image pickup device side, whereas the small diameter portion 22 is located further from the image pickup device side. The large diameter portion 21 faces the first magnetic pole portion 11 and the second magnetic pole portion 12. Thus, the rotor 20 is mainly rotated by the magnetic force generated between the large diameter portion 21, and the first magnetic pole portion 11 and the second magnetic pole portion 12.

A cylindrical portion 31 of the outputting member 30 is press-fitted onto the small diameter portion 22. A fitting hole 34 is formed in the cylindrical portion 31, and has a slightly smaller diameter than that of the small diameter portion 22. In a state in which the cylindrical portion 31 of the outputting member 30 is press-fitted on the small diameter portion 22 of the rotor 20, the cylindrical portion 31 of the outputting member 30 and the large diameter portion 21 of the rotor 20 are substantially identical in the external diameter.

The outputting member 30 includes an arm 32 and a pin 33. The arm 32 extends radially outwardly from the cylindrical portion 31. The pin 33 extends from a distal end of the arm 32 toward the object side along the optical axis. The pin 33 is engaged with the slots 61 and 71. Additionally, a receiving slot 101 is formed in the blade supporting plate 100, for receiving the swinging of the pin 33.

As stated heretofore, the rotor 20 is press-fitted into the fitting hole 34 formed in the outputting member 30. With such a configuration, the outputting member 30 is fitted onto the rotor 20 with the angular position of the outputting member 30 relative to the rotor 20 being adjusted. That is to say, the rotor 20 has plural poles magnetized in the circumferential direction, whereby adjusting the angular position of the outputting member 30 relative to the poles of the rotor 20, and press-fitting the outputting member 30 onto the rotor 20. This changes the design of the angular position with easy.

Therefore, in the design stage of the blade drive device for a camera, it is possible to change and adjust the angular position of the outputting member 30 relative to the rotor 20, after locations of other parts are prior designed. Further, if a problem rises by checking a product before commercial production, the angular position of the outputting member 30 relative to the rotor 20 can be inspected immediately and can be changed to a suitable angular position.

Additionally, as compared with a conventional actuator in which a rotor and a rotor shaft rotate together and the outputting member is fitted onto the rotor shaft, the outputting member 30 is press-fitted onto the rotor 20. Thus an abutting area of the outputting member 30 with the rotor 20 is larger. Therefore, as compared with an actuator in which the outputting member is press-fitted onto the rotor shaft, a misalignment of the angular position of the outputting member 30 relative to the rotor 20 can be restricted while the rotor drives. This allows the electromagnetic actuator 1 to be compatible with a case of a greater load applied on the outputting member 30, such as a high shutter speed.

Additionally, as compared with an actuator in which a rotor and an outputting member are press-fitted onto a rotor shaft, the number of parts is increased and it is difficult to attain the positional accuracy of the angular position of the outputting member relative to the rotor. The electromagnetic actuator 1 according to the present embodiment restricts the number of parts and improves the positional accuracy of the angular position of the outputting member 30 relative to the rotor 20.

As shown in FIG. 4, in a state in which the rotor 20 is press-fitted into the outputting member 30, the cylindrical portion 31 provided in the outputting member 30 has an outer diameter smaller than an inter diameter of magnetic portion composed of the first magnetic pole portion 11 and the second magnetic pole portion 12 of the stator 10, and the cylindrical portion 31 is located within an axial-directional height of the spindle 55 serving as a rotational centering axis of the rotor 20. That is to say, the cylindrical portion 31 has the outer diameter smaller than the inner diameter A of the magnetic portion of the stator 10 with the cylindrical portion 31 being press-fitted onto the small diameter portion 22, and the cylindrical portion 31 is located within axial-directional heights B of the rotor 20. This permits the rotor and the outputting member to be composed of separate members without being changed in conventional size. In other words, the rotor 20 and the outputting member 30 formed separately from each other are provided, while the size of the press-fitted rotor and outputting member is identical to that of a small-sized rotor in which the conventional rotor and outputting member are integrally formed. In this configuration, the angular position of the outputting member 30 relative to the rotor 20 is adjustable and press-fittable. Therefore, it is possible to provide the electromagnetic actuator 1 according to an aspect of the present invention by replacing a rotor of the conventional electromagnetic actuator. Therefore, the actuator maintains smaller size, thus it is possible to restrain upsizing of the blade drive device for a camera 90.

While the exemplary embodiments of the present invention have been illustrated in detail, the present invention is not limited to the above-mentioned embodiments, and other embodiments, variations and modifications may be made without departing from the scope of the present invention.

In the embodiments of the present invention, there has been described the blade drive device for a camera in which the blade supporting plate is disposed at the object side. However, the blade supporting plate may be disposed at the image pickup device side.

Finally, several aspects of the present invention are summarized as follows.

According to an aspect of the present invention, there is provided an actuator including: a coil for excitation; a stator excited with different magnetic poles by energization of the coil; a rotor magnetized with the different magnetic poles in a circumferential direction thereof, and rotated by a magnetic force generating between the rotor and the stator; and an outputting member rotated in conjunction with the rotor and outputting rotational movement of the rotor to a member, and the outputting member being provided with a fitting hole press-fitted onto the rotor.

With such a configuration, the outputting member is fitted onto the rotor with the angular position of the outputting member relative to the rotor being adjusted. This changes the design of the angular position with easy.

Additionally, as compared with a conventional actuator in which an outputting member is fitted onto a rotor shaft having a diameter smaller than that of a rotor, an abutting area of the outputting member with the rotor is larger. Therefore, as compared with an actuator in which the outputting member is press-fitted onto the rotor shaft, a misalignment of the angular position of the outputting member relative to the rotor can be restricted while the rotor drives. Consequently, the above actuator can be employed as a driving source of a device in which a load is greatly applied on an outputting member.

Additionally, the outputting member may have a cylindrical portion press-fitted onto the rotor and an arm portion extending radially outwardly of the cylindrical portion, and the cylindrical portion may have an outer diameter smaller than an inner diameter of a magnetic portion of the stator and may have a height within an axial-directional height of the rotor, with the cylindrical portion being press-fitted onto the rotor.

This configuration permits the rotor and the outputting member to be composed of separate members without being changed in conventional size. In other words, the angular position of the outputting member relative to the rotor is adjustable, while the size of the press-fitted rotor and outputting member is identical to that of a small-sized rotor in which the conventional rotor and outputting member are integrally formed. Therefore, it is possible to provide the actuator according to an aspect of the present invention by replacing a rotor of the conventional actuator.

According to another aspect of the present invention, there is provided a blade drive device for a camera including: a base plate having an opening; a blade for opening and closing the opening; and an actuator for driving the blade. The actuator includes; a coil for excitation; a stator excited with different magnetic poles by energization of the coil; a rotor magnetized with the different magnetic poles in a circumferential direction thereof, and rotated by a magnetic force generating between the rotor and the stator; and an outputting member rotated in conjunction with the rotor and outputting rotational movement of the rotor to the blade, and the outputting member being provided with a fitting holes press-fitted onto the rotor.

With such a configuration, the outputting member is fitted onto the rotor with the angular position of the outputting member relative to the rotor being adjusted. This changes the design of the angular position with easy. Therefore, in the design stage of the blade drive device for a camera, it is possible to change and adjust the angular position of the outputting member relative to the rotor, after locations of other parts are prior designed.

Additionally, as compared with a conventional actuator in which an outputting member is fitted onto a rotor shaft having a diameter smaller than that of a rotor, an abutting area of the outputting member with the rotor is larger. Therefore, as compared with an actuator in which the outputting member is press-fitted onto the rotor shaft, a misalignment of the angular position of the outputting member relative to the rotor can be restricted while the rotor drives. This allows the blade drive device for a camera to be compatible with a case of a greater load applied on the outputting member, such as a high shutter speed.

Furthermore, the outputting member may have a cylindrical portion press-fitted onto the rotor and an arm portion extending radially outwardly of the cylindrical portion, and the cylindrical portion may have an outer diameter smaller than an inner diameter of a magnetic portion of the stator and may have a height within an axial-directional height of the rotor, with the cylindrical portion being press-fitted onto the rotor.

This configuration permits the rotor and the outputting member to be composed of separate members without being changed in conventional size. In other words, the angular position of the outputting member relative to the rotor is adjustable, while the size of the press-fitted rotor and outputting member is identical to that of a small-sized rotor in which the conventional rotor and outputting member are integrally formed. Therefore, it is possible to provide the actuator according to an aspect of the present invention by replacing a rotor of the conventional actuator. Consequently, the actuator maintains smaller size, thus it is possible to restrain upsizing of the blade drive device for a camera.

What is claimed is:

1. a blade drive device for a camera comprising:
   a base plate, including a first plate having an opening, a second plate, and a third plate, wherein
   the second plate is arranged at the image pickup device side with respect to the first plate, and
   the third plate is arranged at the object side with respect to the first plate
   a blade, for opening and closing the opening, arranged between the first plate and the third plate; and
   an actuator for driving the blade, wherein the actuator includes:
   a coil for excitation;
   a stator excited with different magnetic poles by energization of the coil;
   a spindle, provided in the first plate and extending to the second plate in an axial-direction from an object side to an image pickup device side;
   a rotor consisting of material magnetized with the different magnetic poles in a circumferential direction thereof, and rotated about the spindle by a magnetic force generating between the rotor and the stator; and
   an outputting member rotated in conjunction with the rotor and outputting rotational movement of the rotor to the blade, and the outputting member being provided with a cylindrical fitting hole portion press-fitted onto a cylindrical end portion of the rotor, wherein
   the outputting member has the cylindrical fitting hole portion press-fitted onto the cylindrical end portion of the rotor so as to have the cylindrical end portion of the rotor disposed within the cylindrical fitting hole portion of the outputting member, and an arm portion extending radially outwardly of the cylindrical portion, the cylindrical fitting hole portion has an outer diameter smaller than an inner diameter of a magnetic portion of the stator and the cylindrical fitting hole portion has a height that is within the axial-directional height of the rotor of material having the different magnetic poles in a circumferential direction, with the cylindrical fitting hole portion being press-fitted onto the cylindrical end portion of the rotor, the blade is arranged at an object side with respect to the rotor, and the outputting member has a pin extending to the object side and engaging with the blade.

\* \* \* \* \*